United States Patent
Broick (10) Patent No.: US 8,281,946 B1
(45) Date of Patent: Oct. 9, 2012

(54) HOSE CONCEALING DEVICE

(76) Inventor: Leslie Broick, Littleton, CO (US)

( * ) Notice: Subject to any disclaimer, the term of this patent is extended or adjusted under 35 U.S.C. 154(b) by 216 days.

(21) Appl. No.: 12/899,284

(22) Filed: Oct. 6, 2010

(51) Int. Cl.
*A47G 19/00* (2006.01)
*B65D 51/28* (2006.01)

(52) U.S. Cl. .................. 220/23.86; 220/501; 206/423

(58) Field of Classification Search .............. 220/4.27, 220/23.83, 501, 521, 528; 206/389, 423; 47/39, 48.5
See application file for complete search history.

(56) References Cited

U.S. PATENT DOCUMENTS

| | | | |
|---|---|---|---|
| 4,757,838 A | 7/1988 | McGullion | |
| 5,011,034 A | 4/1991 | Abel | |
| 5,782,035 A | 7/1998 | Locke et al. | |
| 5,988,207 A | 11/1999 | Kownacki et al. | |
| 6,467,499 B1 | 10/2002 | Smith | |
| 6,684,813 B1 | 2/2004 | Lemon | |
| 6,883,537 B1 | 4/2005 | Lin | |
| 7,024,818 B2 | 4/2006 | Maniscalco et al. | |
| 7,788,849 B1 * | 9/2010 | Cleveland | 47/66.7 |
| 2006/0168883 A1 | 8/2006 | Brutsche, III et al. | |
| 2007/0084109 A1 | 4/2007 | Brister | |
| 2007/0090226 A1 | 4/2007 | Higgins | |
| 2009/0212051 A1 | 8/2009 | Liu | |
| 2010/0270195 A1 * | 10/2010 | Ridgway et al. | 206/423 |

* cited by examiner

*Primary Examiner* — Harry Grosso
(74) *Attorney, Agent, or Firm* — Albert Haegele; Leyendecker & Lemire, LLC (57) ABSTRACT

A hose concealing device adapted to contain and conceal a coiled hose within an inner cavity is described. The inner cavity resides beneath a planting receptacle, which is equipped with drainage means that permits water to drain therefrom, rather than accumulating within the planting receptacle. The drainage means is adapted to collect excess water from the planting receptacle and prevent the water from dripping onto or otherwise contaminating the coiled hose.

20 Claims, 7 Drawing Sheets

HOSE CONCEALING DEVICE

FIELD OF THE INVENTION

The present invention relates generally to pots or vessels adapted to conceal items within the pots or vessels.

BACKGROUND

Hoses are frequently used in residential and commercial applications for distributing fluid. Fluids typically distributed by use of hoses include water and compressed air.

Hoses left in an uncoiled configuration when not in use may appear unkempt or unsightly, and may be hazardous as well. For example, a garden hose left uncoiled and strewn about residential property may present an untoward appearance and present a tripping hazard. Accordingly, coiling a hose into a relatively compact configuration is desirable, and numerous devices exist to assist hose coiling and storage of coiled hoses. An appealing way of concealing a garden hose is to place the hose in a coiled orientation inside a vessel such as a pot. Placing a relatively shallow tray above the hose, the shallow tray residing inside a top portion of the pot, or on top of the pot, and using the shallow tray as a planting receptacle, is a method of further concealing the coiled hose and imparting an attractive or disguised appearance to the pot or other vessel. Other items, in addition to or rather than a garden hose, may be stored concealed in the vessel. Other items include, but are not limited to, garden tools, gloves, and hose nozzles or spray heads.

Planters, including shallow tray planting receptacles for hose concealing devices, are generally more effective at providing a healthy environment for plants where the planters allow water to drain away from plant roots. Accordingly, planters often have drain holes that allow excess water to drain out of the planter rather than collecting in the planter such that plant roots are submerged in water or water saturated plant medium. Where the planter resides above a coiled hose that is stored in a vessel, water draining out of the planter may keep an outside surface of the hose wet, damp, or submerged in water for extended intervals. Similarly, the water can moisten or drench other items such as gloves stored in the vessel. The water may be replete with nutrients, which can encourage undesirable growth of organisms such as bacteria or other microorganisms, fungus, or algae on items stored in the vessel. Such water may also contain pesticides or herbicides used to treat plants in the planter, which may then be deposited on items stored in the vessel, thereby presenting contamination hazard to persons who subsequently handle the items.

DETAILED DESCRIPTION

Embodiments of the present invention comprise hose concealing devices adapted to contain and conceal coiled hoses or other items within an inner cavity of an outer vessel, with a planting receptacle disposed above the inner cavity. The planting receptacle is equipped with drainage means that permit water to drain from, rather than accumulating within, the planting receptacle. The hose concealing device further comprises a channel assembly adapted to collect water that drains from the planting receptacle and prevent the water from dripping onto or otherwise contacting the hose in the hose compartment. The channel assembly typically directs the water such that it exits the vessel without contacting the hose or running down an outside surface of the hose concealing device.

TERMINOLOGY

The terms and phrases as indicated in quotation marks (" ") in this section are intended to have the meaning ascribed to them in this Terminology section applied to them throughout this document, including in the claims, unless clearly indicated otherwise in context. Further, as applicable, the stated definitions are to apply, regardless of the word or phrase's case, to the singular and plural variations of the defined word or phrase.

The term "or" as used in this specification and the appended claims is not meant to be exclusive; rather the term is inclusive, meaning either or both.

References in the specification to "one embodiment", "an embodiment", "another embodiment, "a preferred embodiment", "an alternative embodiment", "one variation", "a variation" and similar phrases mean that a particular feature, structure, or characteristic described in connection with the embodiment or variation, is included in at least an embodiment or variation of the invention. The phrase "in one embodiment", "in one variation" or similar phrases, as used in various places in the specification, are not necessarily meant to refer to the same embodiment or the same variation.

The term "couple" or "coupled" as used in this specification and appended claims refers to an indirect or direct physical connection between the identified elements, components, or objects. Often the manner of the coupling will be related specifically to the manner in which the two coupled elements interact.

The term "directly coupled" or "coupled directly," as used in this specification and appended claims, refers to a physical connection between identified elements, components, or objects, in which no other element, component, or object resides between those identified as being directly coupled.

The term "approximately," as used in this specification and appended claims, refers to plus or minus 10% of the value given.

The term "about," as used in this specification and appended claims, refers to plus or minus 20% of the value given.

The term "substantially," as used in this specification and appended claims, means mostly, or for the most part. Thus a structure that is substantially horizontal is closer to horizontal than to vertical, and a structure that is substantially vertical is closer to vertical than to horizontal.

The term "effluent," as used in this specification and appended claims, refers to a liquid that has drained from within a planting receptacle.

The term "plant medium," as used in this specification and appended claims, refers to a composition adapted to supporting or harboring roots of live plants. Plant medium includes, but is not limited to, dirt, soil, potting soil, compost, composted manure, loam, peat, peat moss, thatch, sand, clay, straw, and polyacrylamide or other hydrophilic polymers.

A First Embodiment Hose Concealing Device

A first embodiment hose concealing device 100 is illustrated in FIGS. 1-7. The hose concealing device comprises an outer vessel 105 within which resides a planting receptacle 110 and an inner cavity 115.

Figure 5:
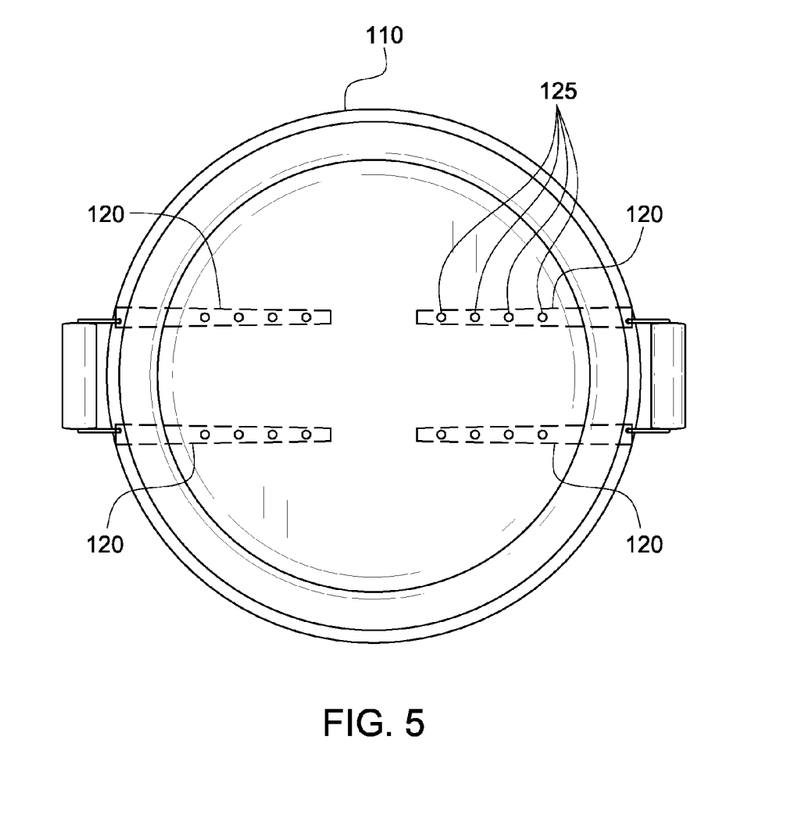
FIG. 5 is a top, pan view of a planting receptacle according to one embodiment of the present invention.
Figure 6:
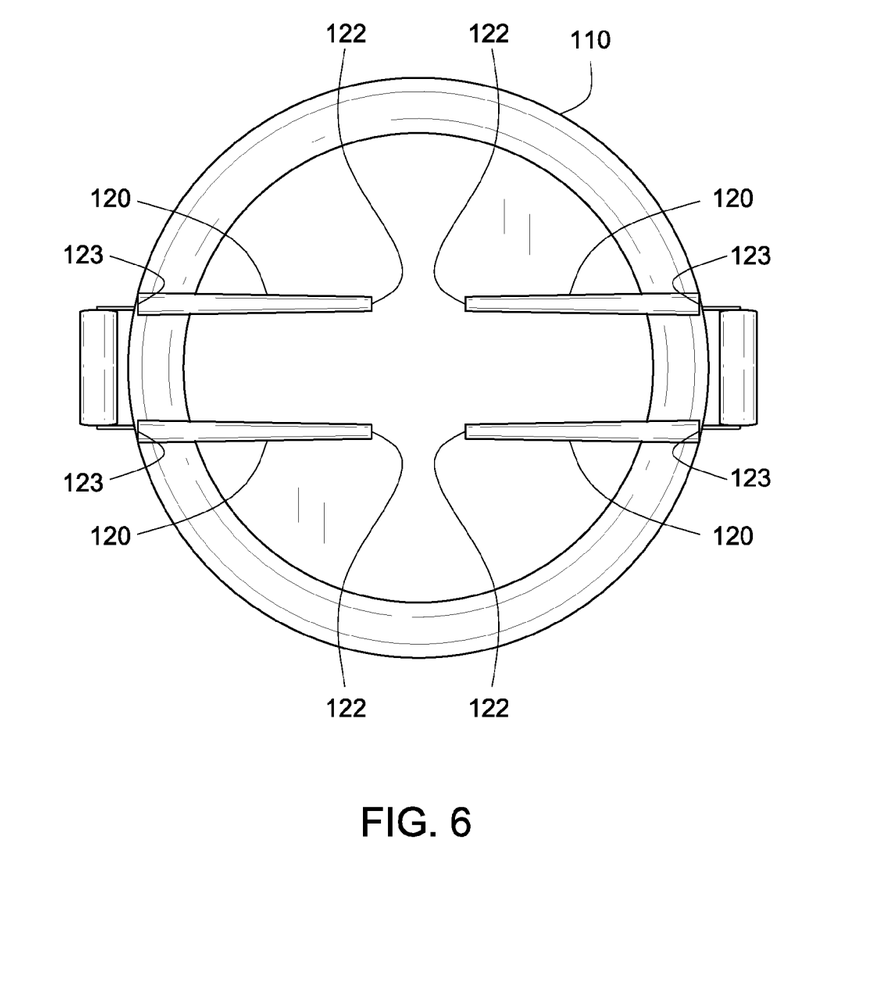
FIG. 6 is a bottom pan view of a planting receptacle according to one embodiment of the present invention.

Residing beneath the planting receptacle 110 and affixed thereto are first channels 120, which are adapted to receive liquid that drains from the planting receptacle through drain holes 125. As best viewed in FIG. 5, the drain holes reside in and extend through a bottom structure of the planting receptacle. FIG. 5 also shows first channels (in hidden line) residing beneath the drain holes in order to receive liquid that flows through the drain holes.

Four second channels 130 are affixed to an inside surface of a wall of the outer vessel 105, the wall surrounding the inner cavity 115. The first channels 120 and second channels 130 together form a channel assembly. The second channels are configured to receive liquid from the first channels 120 and direct the liquid to a bottom chamber 135 of the outer vessel, where the liquid can exit the outer vessel through lower drain ports 140. In some embodiments, the lower drain ports reside in the outer vessel base 150.

The first embodiment hose concealing device 100 further comprises a floor 145 that resides above the outer vessel base 150, the bottom chamber 135 residing between the floor and the outer vessel base. In some embodiments, relatively dense material such as sand or rocks is placed in the bottom chamber 135 in order to stabilize the hose concealing device. The floor 145 is best viewed in FIGS. 2 and 3. A hose aperture 155 in the outer vessel 105 allows a garden hose 175 to extend from inside the inner cavity 115 to outside the outer vessel, as best viewed in FIG. 2.

When not being used, a garden hose 175 is typically stored coiled inside the inner cavity 115, where the hose is supported above the outer vessel base 150 by the floor 145. The floor includes floor drain ports 146 that permit water to drain from within the inner chamber to the bottom chamber 135. The floor drain ports are best viewed in FIG. 3. An end portion 180 of the hose extends out of the hose concealing device 100, which enables the hose to stay connected to a water faucet while most of the hose is concealed within the inner cavity.

Figure 7:
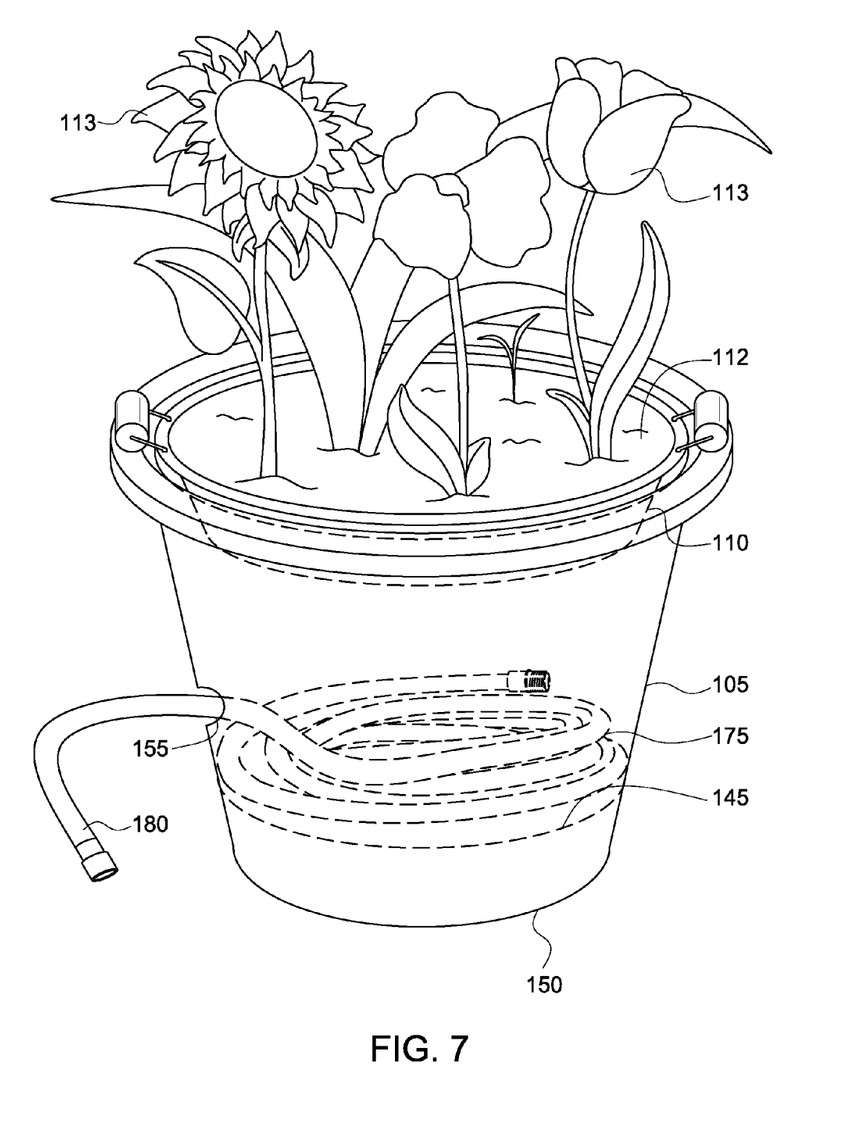
FIG. 7 is a perspective view of a hose concealing device according to one embodiment of the present invention.

As illustrated in FIG. 7, plant medium 112 is disposed within the planting receptacle 110, and plants are living in the medium. The plant medium illustrated in FIG. 7 is potting soil. After installing plants in the plant medium, the medium is typically moistened by occasional or periodic addition of water, whereupon some of the added water percolates through the plant medium and drains out of the planting receptacle 110 through the drain holes 125. The channel assembly is not shown in FIG. 7.

First channels 120 receive water that exits the planting receptacle 110 through the drain holes 125, the water being referred to as effluent after it has exited the planting receptacle. The first channels slant downwardly as they extend from a center portion of the planting receptacle toward a periphery of the outer vessel. Accordingly, the effluent flows downhill toward the periphery of the outer vessel, where the first channels intersect second channels 130. The first channels are typically sealed at their central ends 122 and open at their peripheral ends 123, which allows the effluent to exit the first channels at their peripheral ends and drop into the second channels. Whereas the first channels are about horizontal, and slope downwardly just a few degrees from their central ends toward their peripheral ends, the second channels of the first embodiment are about vertical. In some embodiments the second channels are vertical, and in some embodiments the second channels are sloped less steeply than in the first embodiment.

Figure 1:
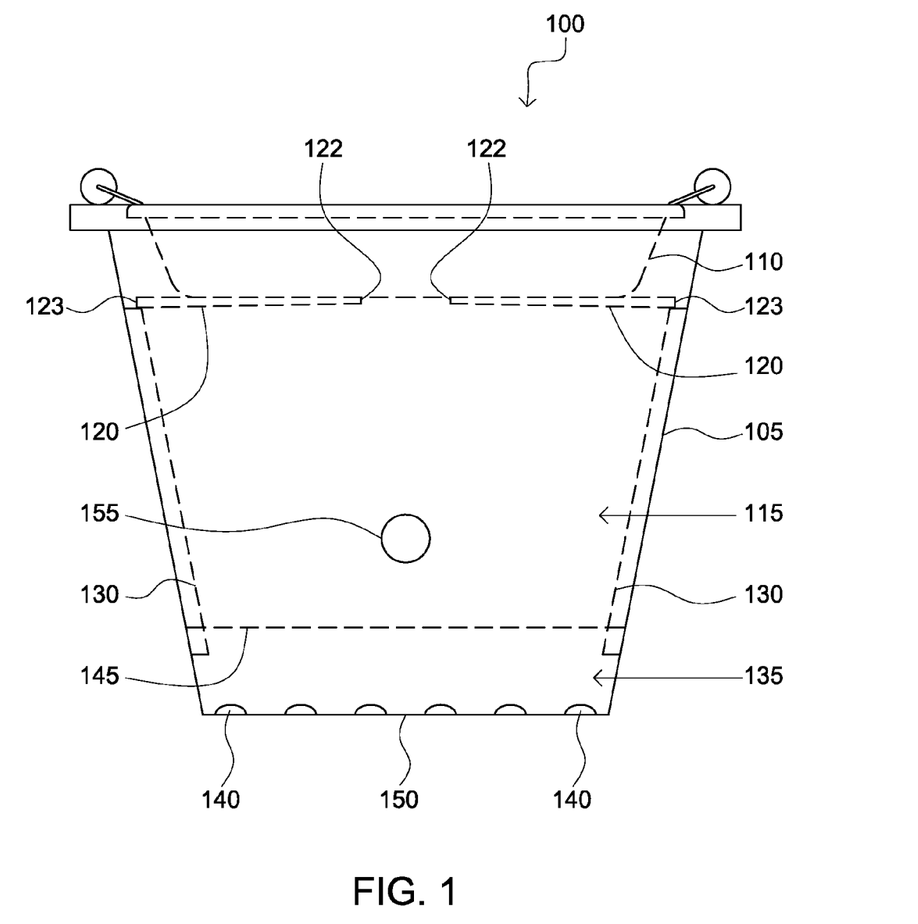
FIG. 1 is a side pan view of a hose concealing device according to one embodiment of the present invention.
Figure 2:
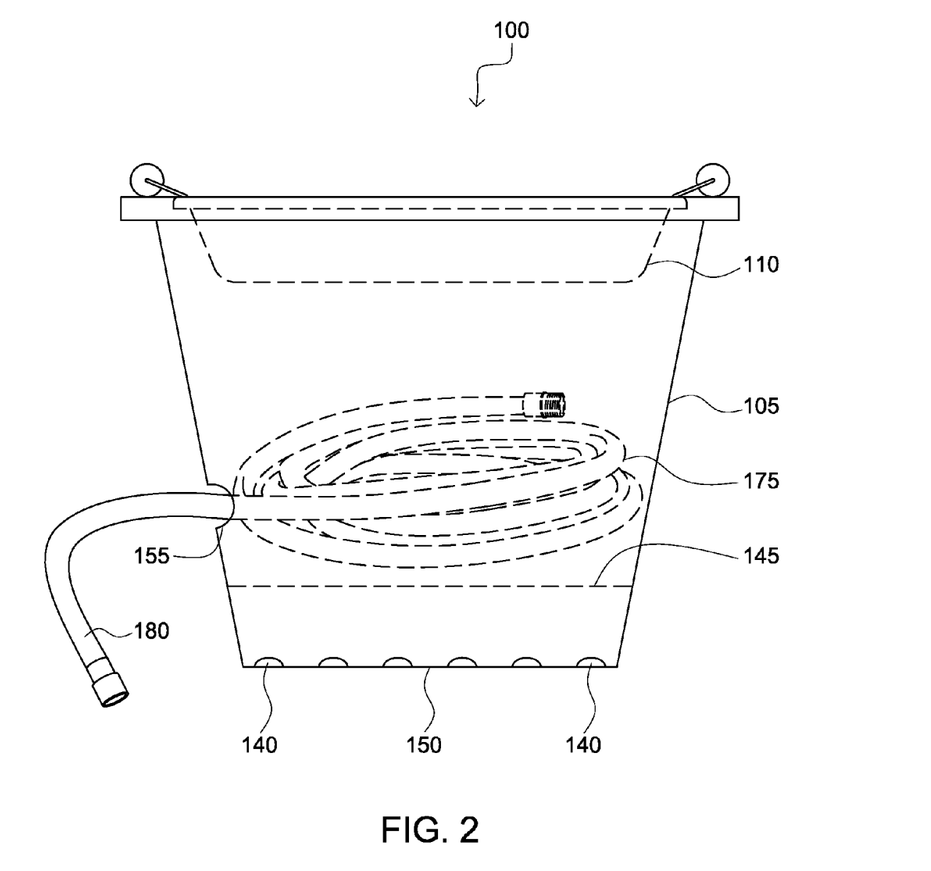
FIG. 2 is a side pan view of a hose concealing device according to one embodiment of the present invention.
Figure 3:
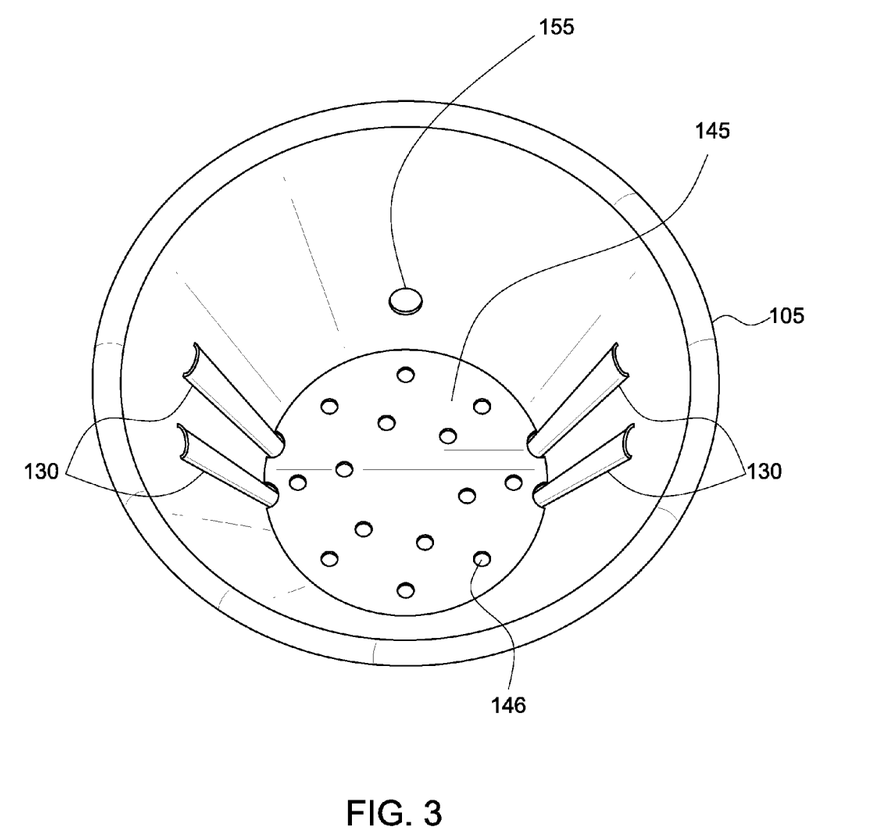
FIG. 3 is a top, perspective view of an outer vessel according to one embodiment of the present invention.
Figure 4:
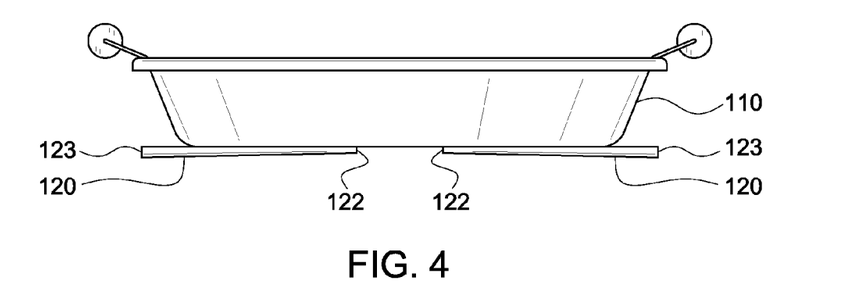
FIG. 4 is a side, pan view of a planting receptacle according to one embodiment of the present invention.

As best seen in FIGS. 1 and 3, the second channels 130 are affixed to and extend down an inside surface of a wall of the outer vessel 105. The second channels of the first embodiment hose concealing device 100 extend from above the floor 145 to below the floor, and are thus adapted to direct effluent received from the first channels into the bottom chamber 135, where the effluent can flow out through lower chamber drain ports 140. The first and second channels 120, 130 of the first embodiment hose concealing device together form a channel assembly, through which effluent flows from the planting receptacle 110 to the lower chamber 135 without contacting the hose 175 in the inner cavity 115.

An effluent path thus typically begins at the drain holes 125, through which liquid exits the plant receptacle 110. The effluent subsequently enters the first channels 120, where it flows downhill toward the peripheral ends 123. After exiting the first channels through the open peripheral ends, the effluent enters the second channels 130, whereupon it flows downwardly past the floor 145. The effluent then exits the second channels into the bottom chamber 135, where it collects until flowing out of the hose concealment vessel through the lower chamber drain ports 140.

The effluent therefore exits the hose concealing device without contacting the garden hose 175 in the inner cavity 115, which deters mold, algae, bacteria, and other organisms that thrive in chronically wet environments from growing on the hose or in the inner cavity. Moreover, contaminants in the effluent, such as herbicides, pesticides, and fertilizers, are prevented from contaminating the garden hose exterior, where the contaminants may be irritating or hazardous to a person handling the hose.

For storage of a garden hose when not in use, a user typically removes the planting receptacle 110 from an upper portion of the outer vessel 105 and coils a garden hose 175 in the inner cavity 115 with an end portion 180 of the garden hose 175 extending through the hose aperture 130. The user then replaces the planting receptacle, which typically contains plants growing in plant medium, in the outer vessel. Thus the garden hose is concealed within the inner cavity by the outer vessel and the planting receptacle.

In order to use the garden hose, a user typically removes the planting receptacle and uncoils the hose while lifting the hose out a top of the outer vessel, thereby removing a length of garden hose from within the inner cavity. The planting receptacle typically remains apart from the outer vessel while the garden hose is in use.

A Second Embodiment Hose Concealing Device

Figure 8A:
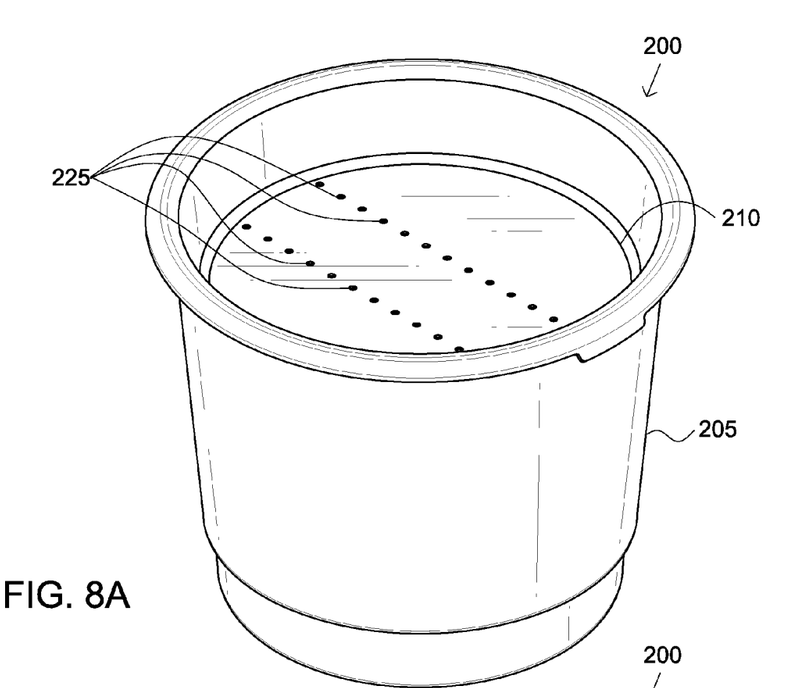
FIG. 8A is a perspective view of a hose concealing device according to one embodiment of the present invention.
Figure 8B:
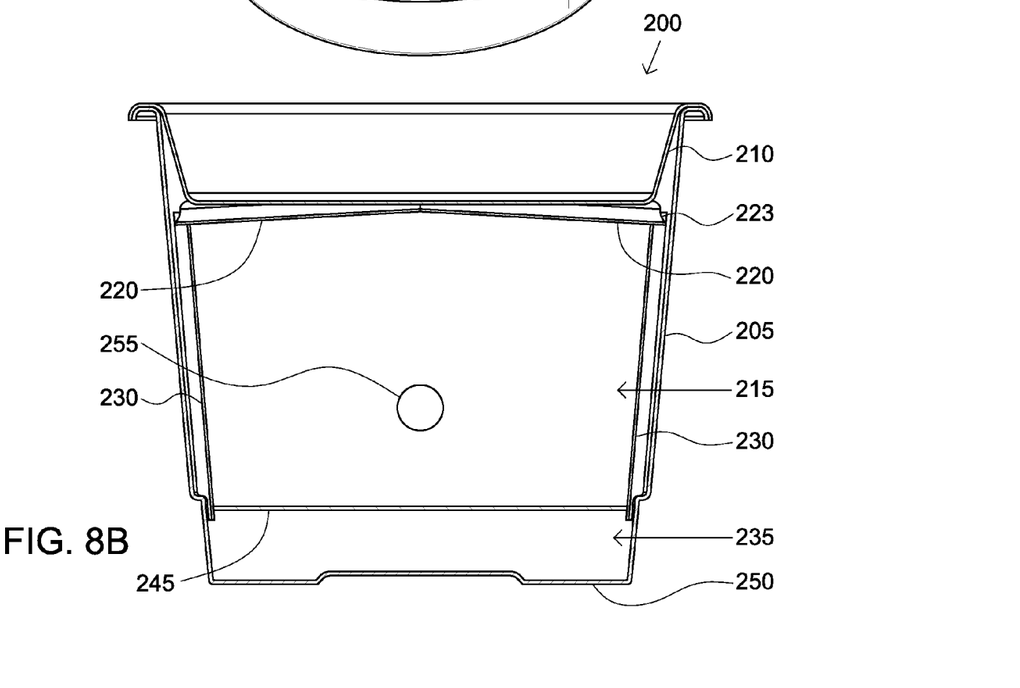
FIG. 8B is a cross section view of a hose concealing device according to one embodiment of the present invention.

A second embodiment hose concealing device 200 is illustrated in FIGS. 8A and 8B. The hose concealing device comprises an outer vessel 205 within which resides a planting receptacle 210 and an inner cavity 215.

Residing beneath the planting receptacle 210 and affixed thereto are first channels 220, which are adapted to receive liquid that drains from the planting receptacle through drain holes 225.

Second channels 230 are affixed to an inside surface of a wall of the outer vessel 205, the wall surrounding the inner cavity 215. The first channels 220 and second channels 230 together form a channel assembly. The second channels are configured to receive liquid from the first channels 220 and direct the liquid to a bottom chamber 235 of the outer vessel, where the liquid can exit the outer vessel through lower drain ports (not shown). In the second embodiment, the lower drain ports reside in the outer vessel base 250.

The second embodiment hose concealing device 200 further comprises a floor 245 that resides above the outer vessel base 250, the bottom chamber 235 residing between the floor and the outer vessel base. Relatively heavy material such as sand or rocks is typically placed in the bottom chamber 235 in order to stabilize the hose concealing device 200. A hose aperture 255 resides in a wall of the outer vessel 205, the hose aperture being adapted to enable a hose to extend from inside the inner cavity 215 to outside the outer vessel.

ALTERNATIVE EMBODIMENTS AND VARIATIONS

The various embodiments and variations thereof, illustrated in the accompanying Figures and/or described above, are merely exemplary and are not meant to limit the scope of the invention. It is to be appreciated that numerous other variations of the invention have been contemplated, as would be obvious to one of ordinary skill in the art, given the benefit of this disclosure. All variations of the invention that read upon appended claims are intended and contemplated to be within the scope of the invention.

I claim:

1. A hose concealing device comprising:
   an outer vessel, the outer vessel including an inner cavity surrounded by a wall and residing above a base, the base being coupled to the wall and the outer vessel sitting on the base when the outer vessel sits upright;
   a planting receptacle, the planting receptacle residing substantially inside the outer vessel above the inner cavity and including drain holes;
   a floor, the floor residing beneath the inner cavity and separating the inner cavity from a lower chamber, the lower chamber residing within the outer vessel above the base; and
   a channel assembly, the channel assembly residing below the drain holes and being adapted to receive an effluent and direct the effluent from the drain holes to the lower chamber.

2. The hose concealing device of claim 1, wherein the channel assembly comprises a first channel, the first channel being (i) disposed substantially horizontally beneath the planting receptacle, and (ii) adapted to receive the effluent.

3. The hose concealing device of claim 2, wherein the channel assembly further comprises a second channel, the second channel residing substantially below the first channel and being adapted to receive the effluent from the first channel.

4. The hose concealing device of claim 3, wherein the second channel is disposed substantially vertically and extends from proximate the first channel to the lower chamber.

5. The hose concealing device of claim 4, wherein the hose concealing device further comprises a lower chamber drain port, the lower chamber drain port residing in the wall or the base of the outer vessel and leading from the lower chamber to outside the outer vessel.

6. A hose concealing combination comprising:
   the hose concealing device of claim 1;
   a hose, the hose residing substantially within the inner cavity; and
   plant medium, the plant medium residing in the planting receptacle.

7. The hose concealing combination of claim 6, wherein:
   the hose concealing device further comprises a hose aperture, the hose aperture residing in the wall; and
   the hose extends through the hose aperture from within the inner cavity to outside the hose concealing device.

8. The hose concealing combination of claim 7, wherein the channel assembly is adapted to isolate the effluent from the hose in the inner cavity.

9. A method of using the hose concealing combination of claim 8 comprising adding a liquid to the planting receptacle, wherein the liquid drains from within the planting receptacle and the effluent flows within the channel assembly from the planting receptacle to the lower chamber without contacting the hose.

10. A method of using a hose concealing device comprising:
    providing a hose concealing device, the hose concealing device including:
      an outer vessel, the outer vessel (i) including an inner cavity surrounded by a wall and (ii) residing above a base, the base being coupled to the wall and the outer vessel sitting on the base when the outer vessel is sits upright;
      a planting receptacle, the planting receptacle residing substantially inside the outer vessel above the inner cavity and including drain holes;
      a floor, the floor residing beneath the inner cavity and partitioning the inner cavity from a lower chamber, the lower chamber residing within the outer vessel above the base; and
      a channel assembly, the channel assembly residing below the drain holes;
    placing a hose substantially within the inner cavity;
    adding a liquid to the planting receptacle, wherein the liquid drains from within the planting receptacle and an effluent flows within the channel assembly from the drain holes to the lower chamber without contacting the hose.

11. The method of claim 10, wherein the hose concealing device further comprises a lower chamber drain port, the lower chamber drain port residing in the wall or the base of the outer vessel and leading from the lower chamber to outside the outer vessel.

12. The method of claim 11, wherein the effluent exits the outer vessel through the lower chamber drain port.

13. The method of claim 12, wherein the channel assembly comprises a first channel, the first channel being (i) disposed substantially horizontally beneath the planting receptacle, and (ii) adapted to receive the effluent.

14. The method of claim 13, wherein the channel assembly further comprises a second channel, the second channel residing substantially below the first channel in a substantially vertical orientation and being adapted to receive the effluent from the first channel.

15. The method of claim 14, wherein:
    the hose concealing device further comprises a hose aperture, the hose aperture residing in the wall; and
    the hose extends through the hose aperture from within the inner cavity to outside the hose concealing device.

16. The method of claim 15, further comprising coupling the hose to a water faucet.

17. A method of making a hose concealing device comprising:
- providing an outer vessel, the outer vessel (i) including an inner cavity surrounded by a wall, and (ii) residing above a base, the base being coupled to the wall and the outer vessel sitting on the base when the outer vessel is sits upright;
- providing a planting receptacle, the planting receptacle residing substantially inside the outer vessel above the inner cavity and including drain holes;
- providing a floor, the floor residing beneath the inner cavity and partitioning the inner cavity from a lower chamber, the lower chamber residing within the outer vessel above the base; and
- providing a channel assembly, the channel assembly residing below the drain holes and being adapted to receive an effluent and direct the effluent from the drain holes to the lower chamber.

18. The method of making a hose concealing device of claim 17, wherein the channel assembly comprises a first channel, the first channel being (i) disposed substantially horizontally beneath the planting receptacle, and (ii) adapted to receive the effluent.

19. The method of making a hose concealing device of claim 18, wherein the channel assembly further comprises a second channel, the second channel residing substantially below the first channel and being adapted to receive the effluent from the first channel.

20. A method of making a hose concealing device of claim 19, wherein the second channel is disposed substantially vertically and extends from proximate the first channel to the lower chamber.

* * * * *